(12) United States Patent
Morton

(10) Patent No.: US 7,434,314 B2
(45) Date of Patent: Oct. 14, 2008

(54) TOOL AND METHOD FOR JOINING SIDELAPPED JOINTS OF DECK PANELS

(76) Inventor: Virgil Morton, 6526 Pheasant Grove La., Montague, CA (US) 96064

(*) Notice: Subject to any disclaimer, the term of this patent is extended or adjusted under 35 U.S.C. 154(b) by 269 days.

(21) Appl. No.: 11/351,463

(22) Filed: Feb. 10, 2006

(65) Prior Publication Data
US 2007/0186422 A1 Aug. 16, 2007

(51) Int. Cl.
*B21D 47/00* (2006.01)
*B21D 31/02* (2006.01)
*B23P 11/00* (2006.01)
*B21J 9/18* (2006.01)
*B25B 7/12* (2006.01)
*B26B 13/00* (2006.01)
*E04D 1/00* (2006.01)

(52) U.S. Cl. .......... 29/897.31; 29/897.3; 29/897.35; 29/243.5; 29/243.58; 72/451; 72/409.12; 72/325; 30/226; 52/528; 52/537

(58) Field of Classification Search .......... 29/243.5, 29/243.58, 283, 514, 521, 566.1, 897.3, 897.31, 29/897.35; 30/226; 52/528, 537, 588; 7/134; 72/325–327, 333, 409.12, 451
See application file for complete search history.

(56) References Cited

U.S. PATENT DOCUMENTS

| 182,193 | A | | 9/1876 | Holeton |
|---|---|---|---|---|
| 2,874,666 | A | * | 2/1959 | Thor ............... 29/243.5 |
| 3,641,729 | A | | 2/1972 | Irvin |
| 4,171,599 | A | | 10/1979 | Lipp |
| 4,186,535 | A | | 2/1980 | Morton |
| 4,307,553 | A | | 12/1981 | Puckett |
| 4,459,735 | A | | 7/1984 | Sawdon |
| 4,757,609 | A | | 7/1988 | Sawdon |
| 4,918,898 | A | | 4/1990 | McLeod |

(Continued)

FOREIGN PATENT DOCUMENTS

DE 2418009 10/1974

OTHER PUBLICATIONS

ICBO Evaluation Report ER-5439, Reissued May 1, 2001, "Attexor Spot Clinch Connection of Cold-Formed Structural Members", ICBO Evaluation Service, Inc.

(Continued)

*Primary Examiner*—David P. Bryant
*Assistant Examiner*—Alexander P Taousakis
(74) *Attorney, Agent, or Firm*—Cahill, von Hellens & Glazer, P.L.C.

(57) ABSTRACT

A punching tool for forming an attachment in a side-lapped seam of steel decking includes four cutting jaws each having a cutting edge. Two jaws are positioned against one side of the seam, and two jaws are positioned on the opposite side of the seam. An actuator selectively pivots the cutting edges of opposing jaws generally toward each other to a closed position, driving the cutting edges of a first pair of jaws partially past each other for cutting a first slot through the seam, and driving the cutting edges of a second pair of jaws partially past each other for cutting a second slot through the seam. Also disclosed are a method for forming such an attachment, as well as the attachment structure which results therefrom.

25 Claims, 6 Drawing Sheets

U.S. PATENT DOCUMENTS

| | | |
|---|---|---|
| 5,165,213 A | 11/1992 | Finch et al. |
| 5,177,861 A | 1/1993 | Sawdon |
| 5,208,973 A | 5/1993 | Sawdon |
| 5,431,089 A | 7/1995 | Sawdon |
| 5,435,049 A | 7/1995 | Sawdon |
| 5,479,687 A | 1/1996 | Sawdon |
| 5,727,302 A | 3/1998 | Sawdon |
| 5,737,819 A | 4/1998 | Sawdon |
| 5,878,617 A | 3/1999 | Parker |
| 5,927,028 A | 7/1999 | Rossi |
| 5,984,563 A | 11/1999 | Wu |
| 6,092,270 A | 7/2000 | Sawdon |
| 6,115,898 A | 9/2000 | Sawdon |
| 6,212,932 B1 | 4/2001 | Parker |
| 6,397,469 B2 | 6/2002 | Parker |

OTHER PUBLICATIONS

ICBO Evaluation Report ER-2078P (Excerpt), Reissued Dec. 1, 2002, "Verco Steel Decks", ICBO Evaluation Service, Inc., pp. 1-8.
Verco Punchlok® System Product Brochure, published more than one year prior to filing of present application.
Verco Technical Report, "A New Deck Sidelap Connector—With A Punch", by Virgil R. Morton, Staff Engineer, Verco Manufacturing Company, published more than one year prior to filing of present application.
Verco Steel Floor Decks Catalog VFI, Verco Manufacturing Co., excerpt, Copyright 2000, p. 10, Fig. 4, showing "Button Punch".
The Delta Grip System, ASC Steel Deck, Aug. 2002.
Delta Grip Addendum to catalog.

* cited by examiner

TOOL AND METHOD FOR JOINING SIDELAPPED JOINTS OF DECK PANELS

BACKGROUND OF THE INVENTION

1. Field of the Invention

The present invention relates generally to steel decking used to form flooring and roofing diaphragms of buildings, and more particularly, to a tool and method for reliably fastening together sidelapped edges of adjacent deck panels when constructing such building diaphragms.

2. Description of the Related Art

Fluted steel deck panels are well known in the art for constructing flooring and roofing of buildings. Examples of such fluted steel deck panels are shown, for example, in U.S. Pat. Nos. 4,186,535 and 4,894,967, both assigned to the assignee of the present application. Such steel deck panels are typically welded to underlying structural support beams. When properly assembled, such fluted steel deck panels provide a cost-effective diaphragm for floors and roofs, as well as relatively high horizontal shear values.

Such fluted steel deck panels typically include first and second opposing sides that extend parallel to the axes of the flutes. One of such sides includes an upwardly-extending male lip. The other of such sides includes a downwardly-directed U-shaped female channel. When two of such deck panels are placed side-by-side across a span of decking, the U-shaped female channel of one panel is engaged over, or overlapped with, the male lip of the adjacent deck panel to interlock the adjacent sides of such panels. This side-lapped joint must then be properly secured to prevent the side of one panel from slipping longitudinally relative to the side of the adjacent panel, and to prevent vertical separation that can result from horizontal loading due to wind, earthquakes, concrete pours, and the like.

Methods for attaching the side-lapped joints of fluted steel deck panels are well known, and include welding, button-punching, sheet metal screws, riveting, and mechanical deformation of the metal forming such side-lapped joint. For example, in U.S. Pat. No. 182,193 issued in 1876, Holeton discloses a method of forming triangular notches in the side-lapped joint and then folding over such triangular notches to interlock the joint. In U.S. Pat. No. 3,641,729, inventor Irvin discloses the use of lip-clenching dies operated by a clinching tool to cut a slit through the side-lapped joint, and to form opposing lobes for securing the side-lapped joint.

In many instances, side-lapped joints of a steel deck diaphragm must be inspected for consistency and integrity before further construction of a building may proceed. To avoid construction delays, it is desirable to form such side-lapped joints in a manner that allows such joints to be inspected quickly and easily, preferably from the top side of the decking.

One apparatus for forming the side-lap attachments which has met with some success is described in U.S. Pat. No. 6,212,932, entitled "Pneumatic Shear For Forming Structural Louvers". In this patent, a pneumatically-operated tool selectively opens and closes a pair of jaws that are pivotally connected to each other about a common pivot axis. One such jaw includes a single blade having first and second opposing sides forming first and second blunt edges. The second jaw includes two spaced blades that are spaced from each other by the thickness of the single blade on the first jaw, also having blunt edges. Thus, the two spaced blades on the second jaw form a "die" for receiving the single blade on the first jaw when the first and second jaws are pivoted to their closed position. With the jaws in their opened position, the first and second jaws are inserted over a side-lapped seam of a steel deck. The pneumatic tool is then activated to close the jaws toward each other. The single blade of the first jaw passes between the two "die" blades of the second jaw, forming a pair of cuts in the overlapped seam. Further closing of the jaws deforms a central tab in a first direction, while deforming regions on either side of the central tab in the opposite direction. Side-lapped joints formed by use of this apparatus has been shown to securely fasten the side-lapped seams and to satisfactorily resist deformation due to horizontal shear loading.

However, applicant has learned that the apparatus disclosed in U.S. Pat. No. 6,212,932 is subject to breakage when used on heavier gage decking. The single blade provided on the first jaw is subjected to significant stress, as it simultaneously forms two cuts through the overlapped material at the side-lapped seam. In other words, one edge of such single blade forms a first cut in cooperation with a first of the two blades on the second jaw, and the second edge of such single blade forms a second cut in cooperation with the second of the two blades on the second jaw. Because of the significant stress borne by the single blade of the first jaw, such single blade can break, necessitating a stoppage of construction and associated scheduling delays for the user. In addition, such breakage is a significant cost to the tool manufacturer, and related warranty claims detract from the manufacturer's profits.

Accordingly, it is an object of the present invention to provide a punching tool for forming an attachment in an interlocking side-lapped seam of a steel deck structure which provides a solid attachment capable of resisting significant horizontal shear loads.

It is a further object of the present invention to provide such a punching tool which can be operated relatively quickly and easily by a deck installer to attach interlocking side-lapped seams of a steel deck structure.

It is a still further object of the present invention to provide such a punching tool which produces an attachment that can be quickly and easily inspected by an inspector standing atop the assembled steel decking.

Another object of the present invention is to provide such a punching tool having a blade assembly that equalizes the wear on the blades, and which avoids excessive stress on any particular blade, to extend the usable life of the tool.

Still another object of the present invention is to form a sidelapped seam attachment that provides higher shear values by forming an attachment which is more resistant to slippage when subjected to a horizontal load along the longitudinal axis of the sidelapped seam.

Yet another object of the present invention is to provide an improved method of forming such a sidelapped seam attachment.

These and other objects of the present invention will become more apparent to those skilled in the art as the description of the present invention proceeds.

SUMMARY OF THE INVENTION

Briefly described, and in accordance with the preferred embodiments thereof, the present invention relates to a punching tool for forming an attachment in an interlocking side-lapped seam formed between first and second steel deck panels of a steel deck structure. As is conventional, the first steel deck panel includes an upturned male lip along one side edge thereof; the second steel deck panel includes a downwardly-directed U-shaped female channel along one side edge thereof for receiving the upturned male lip of the first steel deck panel. The downwardly-directed U-shaped female channel of the second steel deck panel includes first and second spaced walls.

The punching tool of the present invention includes first, second, third and fourth jaws. The first jaw has a cutting edge for engaging the first wall of the female channel, and the second jaw has a cutting edge for engaging the second wall of the female channel. The second jaw is disposed proximate to the first jaw and generally faces the first jaw, but is laterally offset therefrom, thereby allowing their respective cutting edges to at least partially slide past one another when the jaws are closed.

An actuator is coupled to the first and second jaws for selectively moving the cutting edges of the first and second jaws generally toward each other to a closed position, or away from each other to an open position. In the preferred embodiment, the actuator is powered pneumatically or hydraulically, though it might also be powered by an electric motor. As the actuator moves the first and second jaws toward each other, the cutting edges of the first and second jaws at least partially pass each other for cutting a first slot through the U-shaped channel and the male lip inserted therein.

The punching tool also includes a third jaw having a cutting edge for engaging the first wall of the female channel, preferably spaced apart from the first jaw already mentioned above. In addition, the punching tool includes a fourth jaw having a cutting edge for engaging the second wall of the female channel. This fourth jaw is disposed proximate to the third jaw, and generally facing the third jaw, but laterally offset therefrom, thereby allowing their respective cutting edges to at least partially slide past one another when the jaws are closed.

The actuator already mentioned above is also coupled to the third and fourth jaws for selectively moving the cutting edges of the third and fourth jaws generally toward each other to a closed position at the same time that the actuator moves the cutting edges of the first and second jaws generally toward each other to the closed position. Similarly, the actuator moves the cutting edges of the third and fourth jaws away from each other to an open position at the same time that the actuator moves the cutting edges of the first and second jaws away from each other to the open position. The cutting edges of the third and fourth jaws at least partially pass each other as the actuator moves the third and fourth jaws to the closed position for cutting a second slot through the U-shaped channel and the male lip received thereby; this second slot is laterally spaced from the first slot cut by the first and second jaws.

The cutting edges of the first and second jaws are moved by the actuator within first and second planes, respectively. In one preferred embodiment of the invention, these first and second planes are generally co-planar for allowing the respective cutting edges to pass very closely to each other. Likewise, the cutting edges of the third and fourth jaws are moved by the actuator within third and fourth planes, respectively, and in one preferred embodiment, the third and fourth planes are generally co-planar for allowing the respective cutting edges to pass very closely to each other. In an alternate embodiment, the first and second planes, and the third and fourth planes, are intentionally spaced apart from each other to increase twisting deformation along the cut lines formed in the seam.

In its preferred form, the punching tool of the present invention mounts the first, second, third and fourth jaws for rotation about a common pivot axis. The first and third jaws are preferably coupled to each other for synchronized pivotal movement. Similarly, the second and fourth jaws are preferably coupled to each other for synchronized pivotal movement. In the preferred embodiment, the second jaw is disposed generally between the first and third jaws, and the third jaw is disposed generally between the second and fourth jaws.

Preferably, one or more of the jaws are beveled. For example, the first jaw includes a first side forming the cutting edge thereof and also an opposing second side that forms a non-cutting edge; the first jaw is beveled from its cutting edge to its non-cutting edge. As a result, when the actuator closes the jaws, the first jaw displaces the male lip and female channel more significantly proximate its cutting edge than proximate its non-cutting edge. Similarly, the second jaw preferably includes a first side forming its cutting edge and an opposing second side forming a non-cutting edge, with a bevel extending from its cutting edge to its non-cutting edge. Accordingly, the second jaw displaces the male lip and female channel more significantly proximate its cutting edge than proximate its non-cutting edge.

In the preferred form of the invention, the third jaw likewise includes a first side forming the cutting edge thereof and an opposing second side that forms a non-cutting edge. As the actuator closes the jaws, the non-cutting edges of the second and third jaws begin to approach one another. However, at least in one preferred embodiment, the non-cutting edges of the second and third jaws do not slide past each other when the actuator closes the jaws, but rather remain spaced apart from each other at such closed position.

Another aspect of the present invention relates to a novel method of forming an attachment in an interlocking side-lapped seam of such a steel deck structure. In practicing such method, the upturned male lip of the first steel deck panel is engaged within the downwardly-directed U-shaped female channel of the second steel deck panel. A first jaw having a cutting edge is positioned proximate the first wall of the female channel. A second jaw having a cutting edge is positioned proximate the second wall of the female channel. This second jaw is disposed proximate to the first jaw, and generally facing the first jaw, but is laterally offset therefrom. A third jaw having a cutting edge is positioned proximate to the first wall of the female channel, and spaced apart from the first jaw. A fourth jaw having a cutting edge is positioned proximate to the second wall of the female channel, proximate to the third jaw, and generally facing the third jaw, but laterally offset therefrom. The cutting edges of the first and second jaws are selectively moved generally toward each other from an open position to a closed position for causing their respective cutting edges to at least partially pass each other to cut a first slot through the U-shaped channel and the male lip received thereby. Likewise, the cutting edges of the third and fourth jaws are selectively moved generally toward each other from the open position to the closed position, for causing their respective cutting edges to at least partially pass each other to cut a second slot through the U-shaped channel and the male lip received thereby. This second slot is laterally spaced from the first slot.

In the preferred form of such method, these steps of selectively moving the cutting edges of the first and second jaws toward each other, and selectively moving the cutting edges of the third and fourth jaws toward each other, are performed synchronously. Ideally, the first jaw is spaced apart from the third jaw, and the fourth jaw is spaced apart from second jaw. Preferably, in the vicinity of the first slot, the first jaw deforms the upturned male lip and U-shaped female channel in a first direction, and the second jaw deforms the upturned male lip and U-shaped female channel in a second, opposite direction. Similarly, at the second slot, the third jaw deforms the upturned male lip and U-shaped female channel in the first direction, and the fourth jaw deforms the upturned male lip and U-shaped female channel in the second, opposite direction.

When selectively moving the cutting edges of the first and second jaws generally toward each other, the cutting edges of the first and second jaws are moved within first and second-respective planes. These first and second planes may either be generally co-planar or spaced apart from each other. Likewise, when selectively moving the cutting edges of the third and fourth jaws generally toward each other, the cutting edges of the third and fourth jaws are moved within third and fourth respective planes, and these third and fourth planes may either be generally co-planar with each other or spaced apart from each other.

In practicing the aforementioned method, the first, second, third and fourth jaws are preferably mounted for rotation about a common pivot axis. In this regard, the first and third jaws are preferably coupled to each other for synchronized movement with each other, and the second and fourth jaws are preferably coupled to each other for synchronized movement with each other. In addition, the method preferably includes the steps of disposing the second jaw generally between the first and third jaws, and disposing the third jaw generally between the second and fourth jaws.

In one embodiment, such method includes the further steps of forming the cutting edge of the first jaw on a first side of the first jaw, leaving the opposing second side as a non-cutting edge, and forming a bevel on the first jaw extending from its cutting edge toward its non-cutting edge. Thus, as the jaws close, the cutting edge of the first jaw extends further into the side-lapped seam than the non-cutting edge thereof. As a result, the first jaw displaces the male lip and female channel more significantly proximate its cutting edge than proximate its non-cutting edge. Similarly, the method may include the steps of forming the cutting edge of the second jaw on a first side of the second jaw, leaving the opposing second side as a non-cutting edge, and forming a bevel on the second jaw extending from its cutting edge toward its non-cutting edge for causing the cutting edge of the second jaw to extend further into the side-lapped seam than the non-cutting edge. The second jaw thereby displaces the male lip and female channel more significantly proximate its cutting edge than proximate its non-cutting edge when the jaws are closed.

In one preferred form of practicing such attachment method, the third jaw is also formed to have a cutting edge on one side and a non-cutting edge on its opposing second side. As the jaws are moved from their opened to closed position, the non-cutting edges of the second and third jaws are maintained spaced apart from each other even as the cutting edges of the first and second jaws partially slide past each other. As a result, in such embodiment, no additional slot is formed between the second and third jaws.

Another aspect of the present invention relates to the steel deck structure, incorporating an interlocking side-lapped seam, that results from the use of the above-described punching tool and/or attachment method. Such a steel deck structure includes a first steel deck panel having an upturned male lip along one side edge thereof, and a second steel deck panel including a downwardly-directed U-shaped female channel along one side edge thereof. The U-shaped female channel extends over and receives the upturned male lip of the first steel deck panel to form the side-lapped seam. The U-shaped channel includes first and second walls generally parallel to each other. An attachment is formed within the side-lapped seam to attach the first and second steel deck panels to each other. This seam attachment includes first and second generally-vertical cut lines that each extend through the male lip, and through the first and second walls of the female channel. These two cut lines generally-vertical cut lines extend generally parallel to each other and are somewhat spaced apart from each other.

The attachment formed in the side-lapped seam includes a central portion that lies between the first and second cut lines; this central portion may be generally continuous and unbroken; alternatively, it may be deformed to the extent of including a relatively shallow cut. Adjacent the first cut line, a first outer portion of the attachment is separated from the central portion of the attachment; similarly, adjacent the second cut line, a second outer portion of the attachment is separated from the central portion of the attachment.

The central portion of the attachment that lies adjacent the first cut line is deformed in a first direction; on the other hand, the central portion of the attachment that lies adjacent the second cut line is deformed in a second opposing direction. The first outer portion of the attachment, lying adjacent the first cut line, is deformed in the second direction. Conversely the second outer portion of the attachment is deformed in the first direction. These attachments can be formed at regular intervals along the side-lapped seam to securely attach the first and second steel deck panels together.

DETAILED DESCRIPTION OF THE PREFERRED EMBODIMENT

Figure 1:
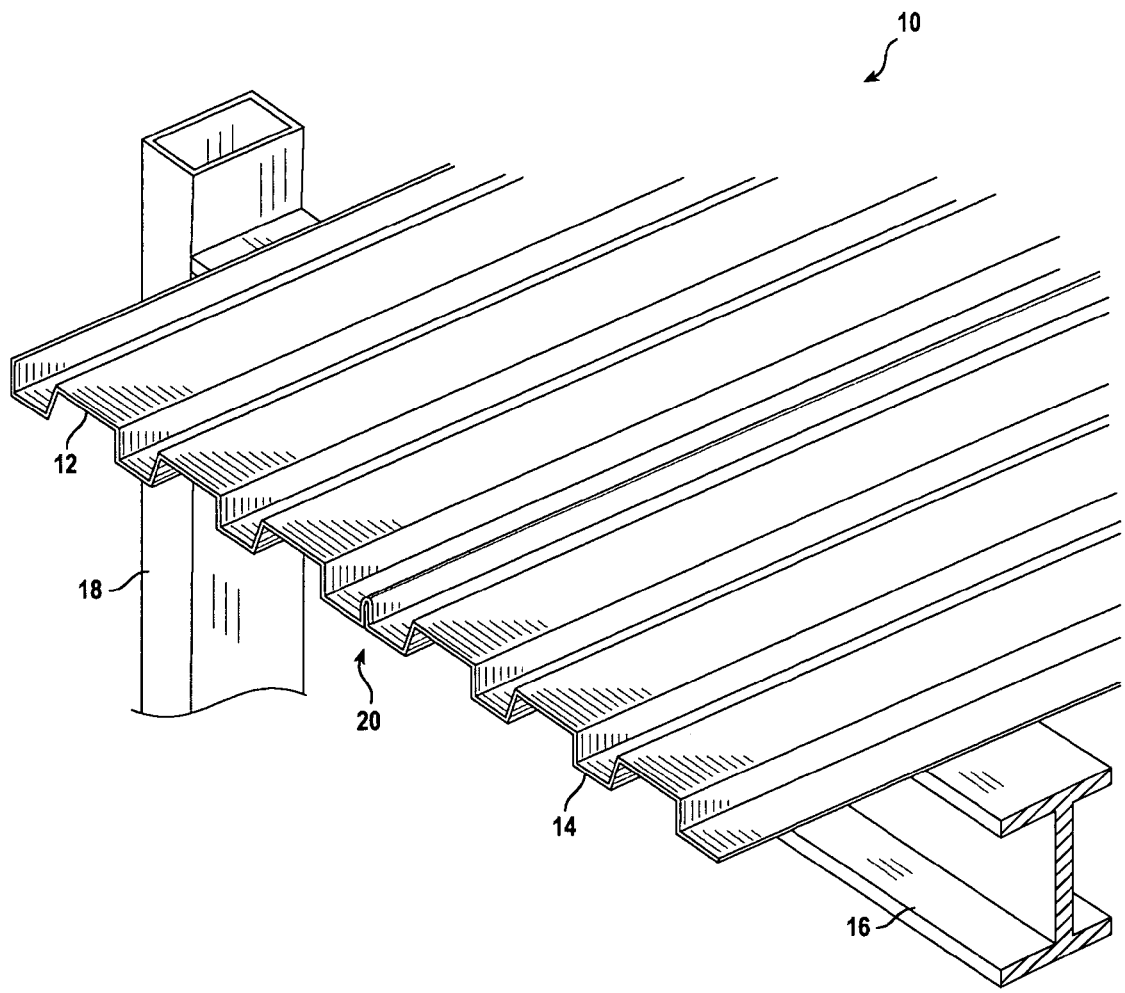
FIG. 1 is a perspective view of a steel deck diaphragm formed by two steel deck panels forming a side-lapped seam along their common edges.

Referring to FIG. 1, a steel deck structure is designated generally by reference numeral 10 and includes at least a first fluted steel deck panel 12 and a second fluted steel deck panel 14. Deck panels 12 and 14 are welded or otherwise fastened to, and supported by, underlying horizontal steel support beams 16. In turn, horizontal steel support beams 16 are welded to, and supported by, vertical steel framing members 18, as is known in the art. Steel deck panels 12 and 14 are joined along a common longitudinal edge by a side-lapped seam 20, the details of which are described below. It will be sufficient to note here that side-lapped seam 20 should be secured in a manner which not only prevents the common longitudinal edges of panels 12 and 14 from separating from each other, but also prevents such common longitudinal edges of panels 12 and 14 from slipping or sliding longitudinally relative to each other.

Figure 2:
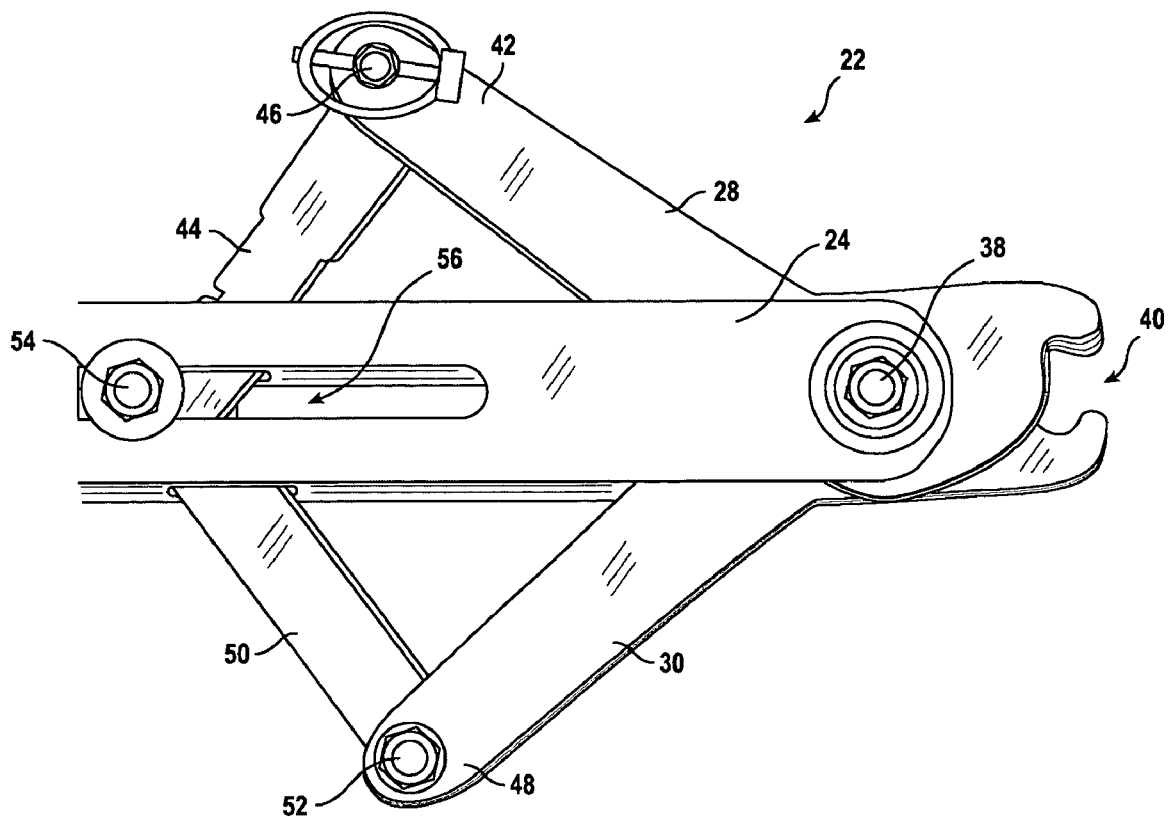
FIG. 2 is a front view of the working end of a punching tool using two sets of opposing pivotally-mounted jaws in accordance with the present invention.
Figure 7:
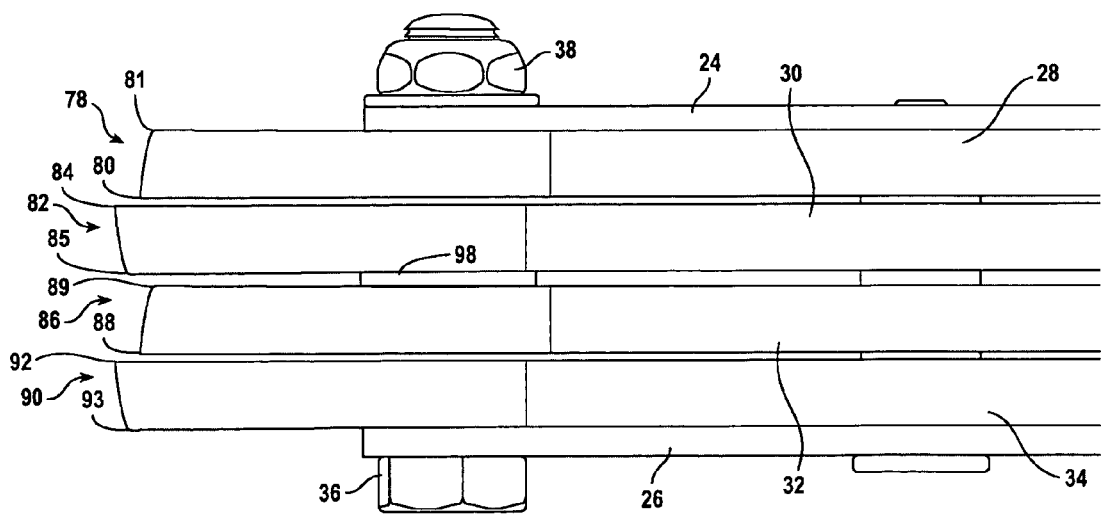
FIG. 7 is an enlarged side view of first, second, third, and fourth jaws of the punching tool shown in FIG. 2 each mounted for pivotal rotation about a connecting pivot axle bolt.
Figure 8:
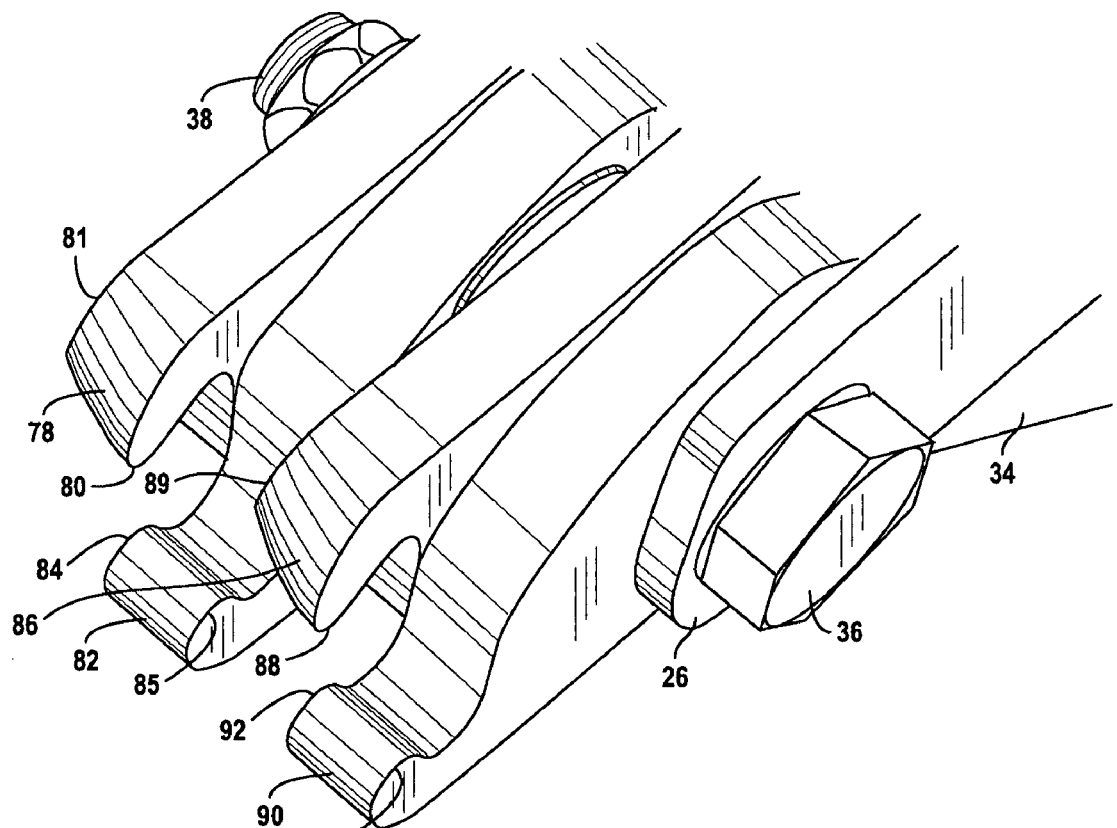
FIG. 8 is a perspective view of the first, second, third, and fourth jaws of the punching tool shown in FIG. 2 in their opened position.
Figure 9:
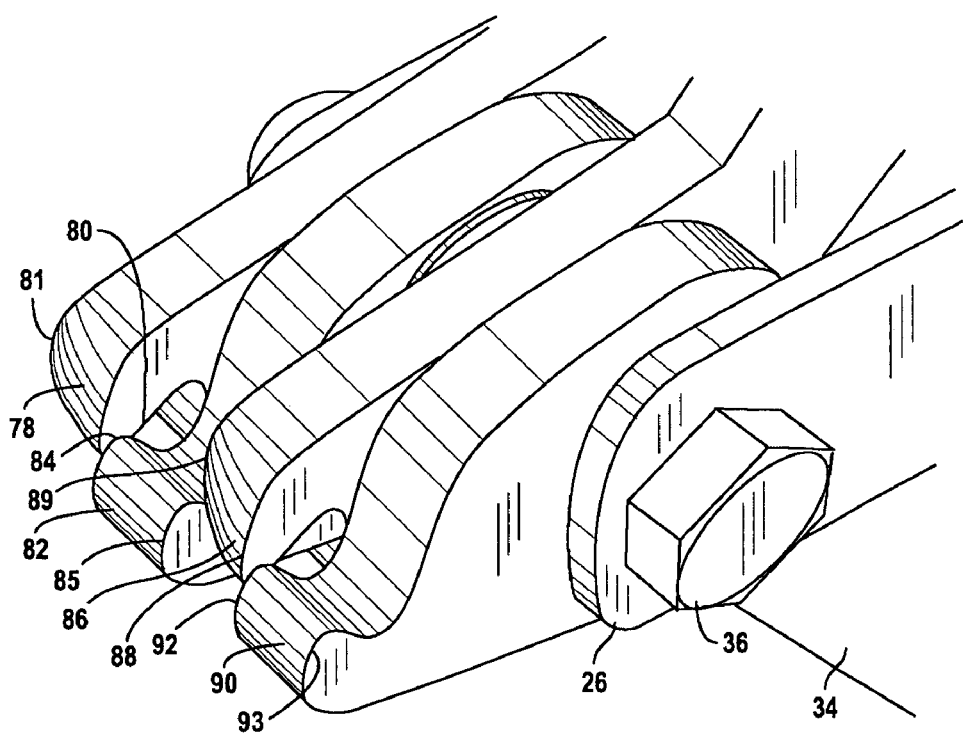
FIG. 9 is a perspective view of the first, second, third, and fourth jaws of the punching tool shown in FIG. 2 in their closed position.

Turning to FIG. 2, a punching tool constructed in accordance with the teachings of the present invention is designated generally by reference numeral 22. Punching tool 22 includes a first fixed support bracket 24 and a second complementary fixed support bracket 26 (see FIG. 7). Referring briefly to FIG. 7, a set of four cutting arms 28, 30, 32 and 34 are secured for pivotal rotation between fixed support brackets 24 and 26. A common pivot axle bolt 36, secured by a mating nut 38, extends through aligned apertures formed in brackets 24 and 26, and formed in cutting arms 28, 30, 32 and 34, for allowing cutting arms 28, 30, 32 and 34 to pivot relative to fixed support brackets 24 and 26. Each of the four cutting arms 28, 30, 32 and 34 has a first end forming a cutting jaw; the cutting jaws are collectively designated by reference numeral 40 in FIG. 2.

As shown in FIG. 2, the second end 42 of cutting arm 28 is pivotally secured to a first end of link 44 by a pivot bolt 46. While hidden from view in FIG. 2, the second end of cutting arm 32 (see FIG. 7) is likewise pivotally secured to the first end of link 44 by pivot bolt 46. The second end 48 of cutting arm 30, and the second end of cutting arm 34 (see FIG. 7), are both pivotally secured to a first end link 50 by pivot bolt 52. The second ends of links 44 and 52 are both pivotally secured to a slide-action drive bolt 54 that reciprocates within slot 56 of fixed support brackets 24 and 26. As drive bolt 54 is actuated within slot 56 toward pivot bolt/nut 36/38, links 44 and 50 cause the second ends 42 and 48 of cutting arms 28 and 30 to rotate outwardly away from support brackets 24 and 26. This in turn causes cutting jaws 40 to pivot from their opened position (shown in FIG. 2) to their closed position. Conversely, when drive bolt 54 is de-actuated within slot 56 away from pivot bolt/nut 36/38, cutting jaws 40 open back up.

The precise mechanism for powering the reciprocation of drive bolt 54 to open and close cutting jaws 40 need not be described herein. It should be sufficient to note that suitable apparatus for controlling and powering reciprocation of drive bolt 54 by hydraulic means is disclosed in prior U.S. Pat. No. 5,878,617 to Parker, the contents of which are hereby incorporated herein by reference. Of course, the actuator used to reciprocate drive bolt 54 need not be hydraulic or pneumatic; for example, an electric motor could also be used to advance and retract drive bolt 54.

Figure 3:
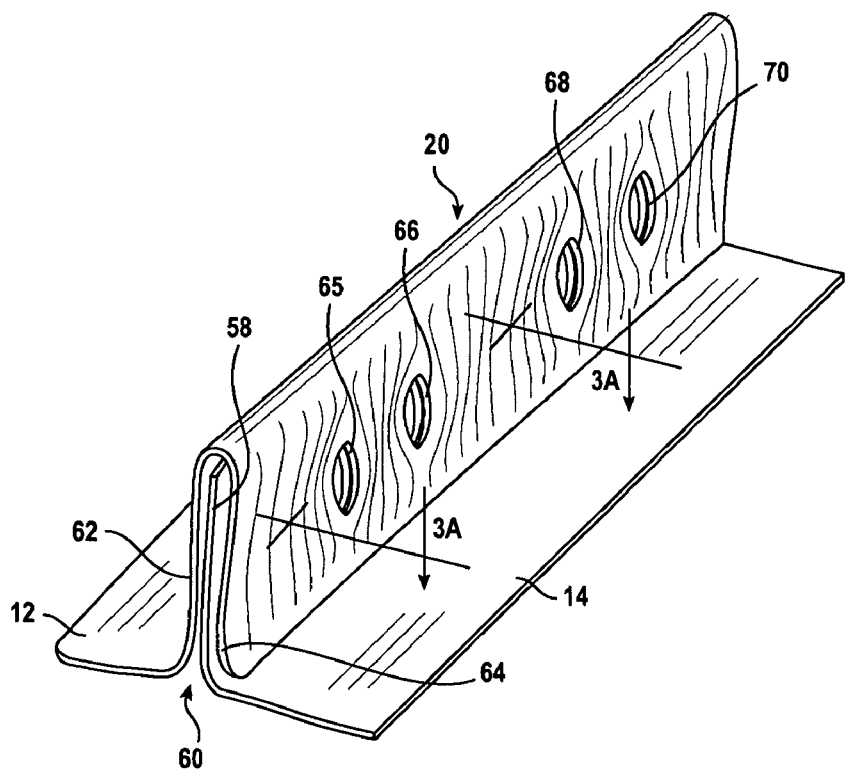
FIG. 3 is an enlarged perspective view of the sidelapped seam portion joining the edges of two adjacent steel deck panels after being punched twice with the tool of FIG. 2.

Referring now to FIG. 3, an abbreviated portion of the interlocking side-lapped seam 20 of FIG. 1 is illustrated in greater detail following two applications of the punching tool of FIG. 2. Steel deck panel 14 includes an upturned male lip 58 along one side edge thereof. Steel deck panel 12 includes a downwardly-directed U-shaped female channel 60 along one side edge thereof for receiving the upturned male lip 58 of steel deck panel 14. U-shaped channel 60 includes a first upwardly-directed wall 62; as upwardly-directed wall 62 reaches its peak, it curves through an arc of 180 degrees, extending downwardly to form a second wall 64. First wall 62 and second wall 64 extend generally parallel to each other, and are spaced apart from each other by a sufficient gap to permit upwardly-directed male lip 58 to be inserted therein. U-shaped female channel 60 of steel deck panel 12 extends over and receives upturned male lip 58 of steel deck panel 14 to form the side-lapped seam 20.

Still referring to FIG. 3, a first actuation of punching tool 22 to seam 20 produces a first pair of slots, or vertical cut lines, 65 and 66. Also shown in FIG. 3 are a second pair of slots 68 and 70, which are produced by a second actuation of punching tool 22 to seam 20. Vertical cut line 65 extends through male lip 58 and through first and second walls 62 and 64 of the female channel 60. Likewise, vertical cut line 66 extends through male lip 58 and through first and second walls 62 and 64 of female channel 60. Vertical cut lines 65 and 66 extend generally parallel to each other and are slightly spaced apart from each other.

The application of punching tool 22 to seam 20 not only forms slots 65 and 66; it also produces opposing conical deformations in seam 20 on either side of such slots. Referring to the sectional view of FIG. 3A, the attachment formed by a first actuation of punching tool 22 includes vertical cut lines 65 and 66. A central portion of such attachment, lying between the first and second cut lines 65 and 66, is designated by reference numeral 72. In the illustrated embodiment, central portion 72 is continuous and unbroken between cut lines 65 and 66. A first outer portion 74 of the attachment lies adjacent first cut line 65 on a side thereof opposite central portion 72 of the attachment. Likewise, a second outer portion 76 of the attachment lies adjacent second cut line 66 on a side thereof opposite central portion 72 of the attachment.

Central portion 72 of the attachment is deformed in a first direction (i.e., to the right relative to FIG. 3A) adjacent first cut line 65; central portion 72 of the attachment is deformed in a second, opposite direction (i.e., to the left relative to FIG. 3A) adjacent second cut line 66. First outer portion 74 of the attachment is deformed in the aforementioned second direction (i.e., to the left relative to FIG. 3A); conversely, second outer portion 76 of the attachment is deformed in the first direction (i.e., to the right relative to FIG. 3A). The resulting attachment securely fastens side-lapped seam 20 together. Moreover, initial testing appears to show that such attachment provides higher horizontal shear values than, for example, those obtained by using the attachment shown in U.S. Pat. No. 6,397,469 to Parker. It is theorized that such initial higher test values may result from the shape and configuration of the above-described conical deformed regions that result adjacent vertical slots 65 and 66.

The actual cutting jaws, collectively represented by reference numeral 40 in FIG. 2, are best illustrated in FIGS. 4-9. A first cutting jaw 78 is formed on the end of cutting arm 28, and includes a cutting edge 80 for engaging one of the walls (e.g., wall 64) of the female channel 20. A second cutting jaw 82 is formed on the end of cutting arm 30 and has a cutting edge 84 for engaging the opposite wall (e.g., wall 62) of female channel 20. Second jaw 82 is disposed proximate first jaw 78 but is laterally offset therefrom. Cutting edge 80 of jaw 78 generally faces cutting edge 84 of second jaw 82. Cutting edge 80 sweeps through a first plane, and cutting edge 84 sweeps through a second plane; these two planes may be generally co-planar, separated only by a small gap to permit the cutting edges to pass each other in the closed position. Alternatively, these first and second planes may be intentionally spaced apart, as by inserting a spacing washer or the like between jaws 78 and 82 to increase twisting deformation of the seam adjacent first slot 65. In the view shown in FIG. 4, first and second jaws 78 and 82 are opened apart from each other; in the view shown in FIG. 5, first and second jaws 78 and 82 are closed, wherein portions of their respective cutting edges 80 and 84 partially pass by each other as the actuator drive bolt 54 (see FIG. 2) closes first and second jaws 78 and 82 for cutting first slot 65 through the U-shaped channel 60 and male lip 58 of seam 20.

A third cutting jaw 86 is formed on the end of cutting arm 32, and includes a cutting edge 88 for engaging one of the walls (e.g., wall 64) of female channel 20. A fourth cutting jaw 90 is formed on the end of cutting arm 34 and has a cutting edge 92 for engaging the opposite wall (e.g., wall 62) of female channel 20. Fourth jaw 90 is disposed proximate third jaw 86 but is laterally offset therefrom. Cutting edge 88 of third jaw 86 generally faces cutting edge 92 of fourth jaw 90. In the view shown in FIG. 4, third and fourth jaws 86 and 90 are opened apart from each other; in the view shown in FIG. 5, third and fourth jaws 86 and 90 are closed, wherein portions of their respective cutting edges 88 and 92 partially pass by each other as the actuator drive bolt 54 (see FIG. 2) closes third and fourth jaws 86 and 90 for cutting second slot 66 through the U-shaped channel 60 and male lip 58 of seam 20. As explained above, actuator drive bolt 54, and links 44 and 50 (see FIG. 2), close third and fourth jaws 86 and 90 at the same time that it closes first and second jaws 78 and 82.

Figure 6:
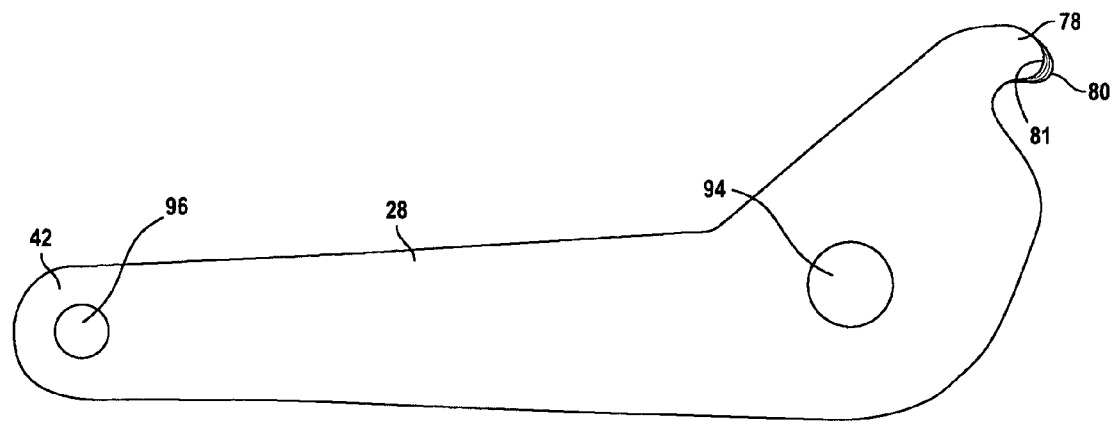
FIG. 6 is a top view of one of the four jaws that are mounted in the punching tool of FIG. 2, including a common pivot axle hole and including a beveled cutting edge.

As noted above, cutting arms 28, 30, 32 and 34 are all mounted for pivotal rotation about pivot axle bolt 36 secured by nut 38. Consequently, first jaw 78, second jaw 82, third jaw 86, and fourth jaw 90 are mounted for rotation about a common pivot axis. Referring briefly to FIG. 6, first cutting arm 28 is shown with cutting jaw 78, and cutting edge 80, formed at one end thereof. Pivot hole 94 is formed near jaw 78 for receiving pivot axle bolt 36. In addition, hole 96 is formed at second end 42 of cutting arm 28 to receive the pivot bolt 46 for attachment to link 44. Cutting arms 28 and 32 are preferably both coupled to pivot bolt 46, thereby coupling first and third jaws 78 and 86 to each other for synchronized movement. Likewise, cutting arms 30 and 34 are preferably both coupled to pivot bolt 52, thereby coupling second and fourth jaws 86 and 90 to each other for synchronized movement. In the preferred embodiment illustrated, second jaw 82 is disposed generally between first and third jaws 78 and 86, and third jaw 86 is disposed generally between second and fourth jaws 82 and 90.

Referring to FIGS. 4-9, and as explained above, each of cutting jaws 78, 82, 86, and 90 has a cutting edge 80, 84, 88, and 92, respectively. In one preferred embodiment of the present invention, each of these cutting jaws includes an opposing non-cutting edge. For example, cutting jaw 78 includes an outer non-cutting edge 81 on an opposite side from cutting edge 80. Similarly, cutting jaw 82 includes a non-cutting edge 85 on an opposite side from cutting edge 84; cutting jaw 86 includes a non-cutting edge 89 on an opposite side from cutting edge 88, and cutting jaw 90 includes an outer non-cutting edge 93 on an opposite side from cutting edge 92.

As shown in FIGS. 4-9, a bevel is preferably formed on each cutting jaw extending from the cutting edge inwardly toward the non-cutting edge thereof. Thus, a bevel is formed upon the end of cutting jaw 78 extending from cutting edge 80 inwardly toward non-cutting edge 81. Accordingly, when the cutting jaws are closed over seam 20 of steel deck structure 10, cutting jaw 78 displaces male lip 58 and female channel 60 to a greater extent proximate cutting edge 80 than proximate non-cutting edge 81. Similarly, a bevel is formed upon the end of cutting jaw 82 extending from cutting edge 84 inwardly toward non-cutting edge 85. Consequently, when the cutting jaws are closed over seam 20 of steel deck structure 10, cutting jaw 82 displaces male lip 58 and female channel 60 to a greater extent proximate cutting edge 84 than proximate non-cutting edge 85. Thus, the cutting forces exerted by cutting jaws 78 and 82, when cutting slot 65 in seam 20, are concentrated along the cutting edges 80 and 84 thereof, and very little, if any, force is exerted on seam 20 by the non-cutting edges 81 and 85 thereof. Similar bevels may be preferably formed upon the third cutting jaw 86 and fourth cutting jaw 90 to facilitate the cutting of slot 66. The aforementioned bevels are illustrated in the patent drawings as straight line bevels, without any curvature; if desired, such bevels can be formed to have a degree of concavity to make the cutting edges sharper.

Referring to FIG. 7, it will be noted that the non-cutting edge 89 of third cutting jaw 86 is generally proximate the non-cutting edge 85 of second cutting jaw 82. It will also be noted that, in the embodiment illustrated in FIG. 7, a spacing washer, or shim, 98 is inserted between cutting arm 30 and cutting arm 32 along pivot axle bolt 36. The combined effect of the aforementioned bevels, plus the additional spacing between the second and third cutting jaws, lessens the likelihood of shearing the seam, as the jaws are closed, within central portion 72 (see FIG. 3A) of the seam attachment. Even though the second jaw 82 and third jaw 86 partially travel past each other as the jaws are closed, the aforementioned bevels, coupled with the additional spacing between the second and third jaws, reduces or eliminates any shearing force exerted on the seam between the second and third jaws 82 and 86, respectively.

On the other hand, should it be desired to create additional deformation within the attachment, particularly within central portion 72 of the attachment, then spacing washer 98 can be omitted, thereby allowing the "non-cutting" edges 85 and 89 to pass more closely toward each other as the jaws are closed to exert a greater twisting force upon central portion 72 of the attachment. In this regard, even if the second and third jaws actually form a shallow cut through seam 20 (in which case, the so-called "non-cutting edges" 85 and 89 might more accurately be considered as "secondary cutting edges"), this shallow cut will not be formed until the jaws are almost fully closed, whereas the cut lines 65 and 66 are at least partially formed well before the jaws reach full closure. Therefore, neither the second jaw nor the third jaw is attempting to cut more than one cut line at any given moment during closure of the jaws.

As noted above, one aspect of the present invention relates to the novel method of forming the seam attachment described above. In practicing such method, upturned male lip 58 of deck panel 14 is engaged within the downwardly-directed U-shaped female channel 60 of deck panel 12. First jaw 78, second jaw 82, third jaw 86 and fourth jaw 90 are inserted into punching tool 22, and the opened jaws are inserted over and around seam 20. Preferably, first jaw 78, second jaw 82, third jaw 86, and fourth jaw 90 are mounted for pivotal rotation about a common pivot axis, such as pivot bolt axle 36. In this regard, first and third jaws 78 and 86 are preferably pivoted as a unit (as by link 44) for synchronized movement with each other, and second and fourth jaws 82 and 90 are preferably pivoted as a unit (as by link 50) for synchronized movement with each other. First jaw 78 and third jaw 86 are positioned proximate one wall (e.g., wall 64) of female channel 60, and second jaw 82 and fourth jaw 90 are positioned proximate a second wall (e.g., wall 62) of female channel 60. Alternatively, the tool can be reversed, and the first and third jaws 78 and 86 can be positioned proximate wall 62, while the second and fourth jaws 82 and 90 are positioned proximate wall 64. While it is not necessary, the punching tool can be periodically reversed as an operator periodically forms attachments along seam 20 to reverse the directions in which the seam is deformed.

After placing the opened jaws over seam 20, the tool operator then actuates punching tool 22 to force the cutting edges 80 and 84 of first and second jaws 78 and 82 generally toward each other from an open position to a closed position, at least partially passing each other to cut first slot 65 through seam 20. Concurrently, cutting edges 88 and 92 of third and fourth jaws 86 and 90 are forced generally toward each other from the open position to the closed position, at least partially passing each other to cut second slot 66 through seam 20, spaced apart slightly from first slot 65. Ideally, first jaw 78 is spaced apart from third jaw 86 (as by second jaw 82), and fourth jaw 90 is spaced apart from second jaw 82 (as by third jaw 86).

Figure 3A:
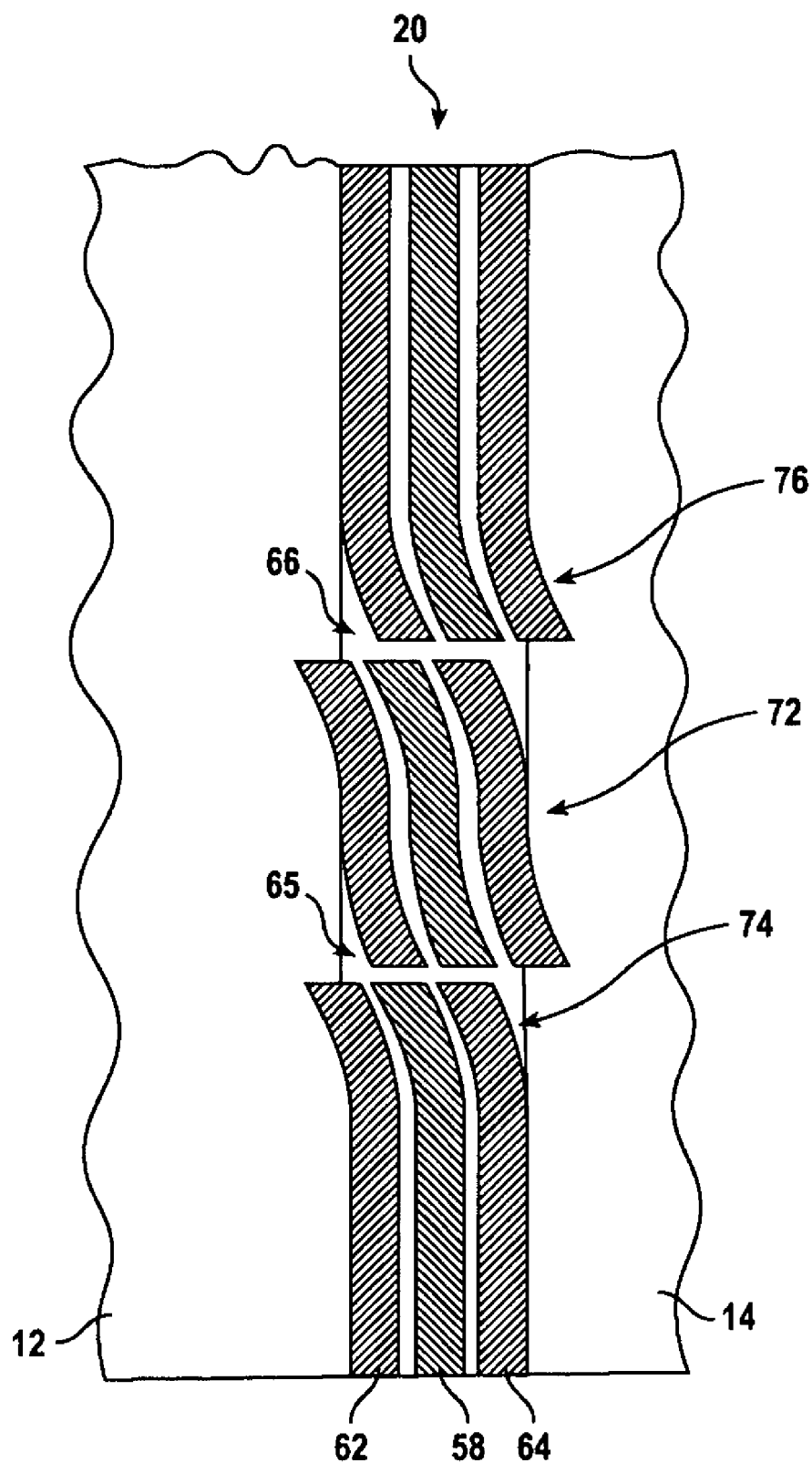
FIG. 3A is a cross-sectional view of the side-lapped seam shown in FIG. 3 taken through the plane indicated by lines 3A-3A in FIG. 3 and illustrating the first and second slots formed in the side-lapped seam by the punching tool of FIG. 2.
Figure 4:
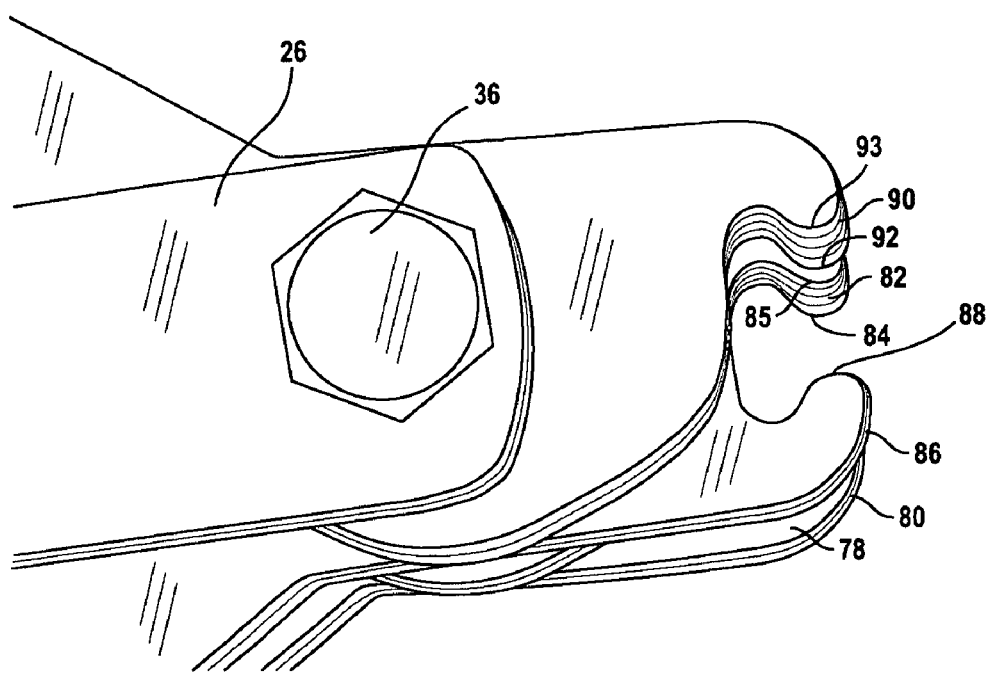
FIG. 4 is an enlarged rear view of the jaws of the punching tool shown in FIG. 2 in their opened position.
Figure 5:
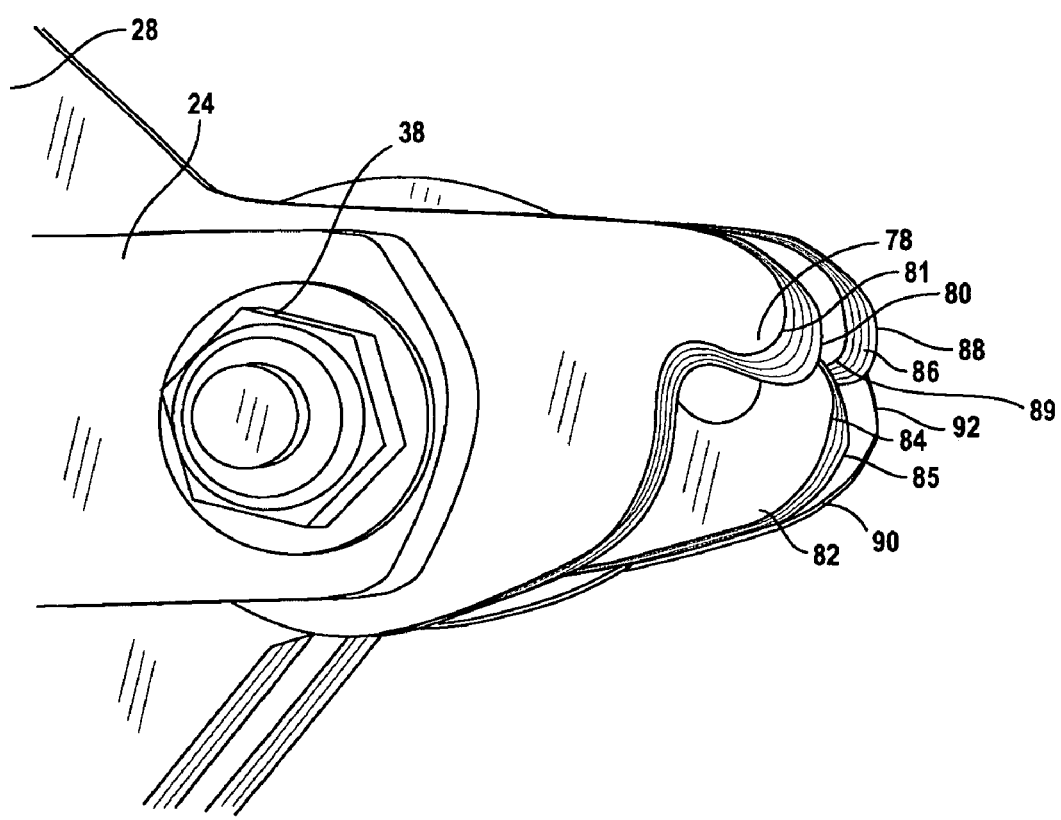
FIG. 5 is an enlarged front view of the jaws of the punching tool shown in FIG. 2 in their closed position.

In practicing this method of forming the attachment, it is preferred that first jaw 78 deforms upturned male lip 58 and U-shaped female channel 60 in a first direction proximate cut line 65, and that second jaw 82 deforms upturned male lip 58 and U-shaped female channel 60 in the opposite direction, as illustrated in FIG. 3A. Similarly, at second slot 66, it is preferred that third jaw 86 deforms upturned male lip 58 and U-shaped female channel 60 in the first direction, and that the fourth jaw 90 deforms upturned male lip 58 and U-shaped female channel 60 in the second, opposite direction.

When selectively moving cutting edges 80 and 84 of first and second jaws 78 and 82 generally toward each other, cutting edges 80 and 84 are moved within first and second respective planes. In one preferred embodiment, cutting edges 80 and 84 are moved through first and second planes that are generally co-planar; in other embodiments, these first and second planes are spaced apart, as by inserting a spacing washer or shim between first and second cutting arms 28 and 30 along pivot axle bolt 36. Likewise, cutting edges 88 and 92 of third and fourth jaws 86 and 90 are moved within third and fourth respective planes; these third and fourth respective planes may either be generally be co-planar with each other, or purposely spaced apart by a spacing washer, if desired.

The method of forming the above-described attachment avoids loading both side edges of any particular jaw at the same point in time. In this regard, the method preferably includes the step of forming a primary cutting edge 80 on a first side of first jaw 78, leaving the opposing second side as a non-cutting edge or secondary cutting edge 81, and forming a bevel on first jaw 78 extending from cutting edge 80 toward opposite edge 81. Preferably, the same steps are used in forming the second, third and fourth jaws 82, 86 and 90. The method of the present invention may further include placement of spacing washer, shims or the like (see 98 in FIG. 7) between one or more of the cutting jaws, either to lessen the likelihood of shearing (as between jaws 82 and 86) or to increase the amount of twisting deformation about vertical cut lines 65 and 66 (as between jaws 78 and 84, and as between jaws 86 and 90).

Those skilled in the art will now appreciate that an improved punching tool has been described for forming an attachment in an interlocking side-lapped seam of a steel deck structure which provides a solid attachment capable of resisting significant horizontal shear loads. The disclosed punching tool can be operated relatively quickly and easily by a deck installer to attach interlocking side-lapped seams of a steel deck structure. The resulting attachment that can be quickly and easily inspected by an inspector standing atop the assembled steel decking. Moreover, the disclosed punching tool includes a cutting blade assembly that equalizes the wear on the blades, thereby avoiding excessive stress on any particular blade and extending the usable life of the tool. In addition, the disclosed method of forming such side-lapped seam attachment, and the resulting seam attachment structure, provides higher horizontal shear loading values, more resistant to slippage when subjected to a horizontal load, than those methods already known.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A method of forming an attachment in an interlocking side-lapped seam of a steel deck structure, the steel deck structure including at least first and second steel deck panels, the first steel deck panel including an upturned male lip along one side edge thereof, the second steel deck panel including a downwardly-directed U-shaped female channel along one side edge thereof for receiving the upturned male lip of the first steel deck panel, the U-shaped channel including first and second walls generally parallel to each other, the method comprising the steps of:
   a. engaging the upturned male lip of the first steel deck panel within the downwardly-directed U-shaped female channel of the second steel deck panel;
   b. positioning a first jaw having a cutting edge proximate the first wall of the female channel;
   c. positioning a second jaw having a cutting edge proximate the second wall of the female channel, the second jaw being disposed proximate the first jaw but laterally offset therefrom, and generally facing the first jaw;
   d. positioning a third jaw having a cutting edge proximate the first wall of the female channel and spaced apart from the first jaw;
   e. positioning a fourth jaw having a cutting edge proximate the second wall of the female channel, the fourth jaw being disposed proximate the third jaw but laterally offset therefrom, and generally facing the third jaw;
   f. selectively moving the cutting edges of the first and second jaws generally toward each other from an open position to a closed position, for causing the cutting edges of the first and second jaws to at least partially pass each other to cut a first slot through the U-shaped channel and the male lip received thereby; and
   g. selectively moving the cutting edges of the third and fourth jaws generally toward each other from the open position to the closed position, for causing the cutting edges of the third and fourth jaws to at least partially pass each other to cut a second slot through the U-shaped channel and the male lip received thereby, the second slot being laterally spaced from the first slot.

2. The method recited by claim 1 wherein the steps of selectively moving the cutting edges of the first and second jaws toward each other, and selectively moving the cutting edges of the third and fourth jaws toward each other, are performed synchronously.

3. The method recited by claim 1 wherein the first jaw is spaced apart from the third jaw, and wherein the fourth jaw is spaced apart from second jaw.

4. The method recited by claim 1 wherein the first jaw deforms the upturned male lip and U-shaped female channel in a first direction adjacent the first slot, and the second jaw deforms the upturned male lip and U-shaped female channel in a second, opposite direction adjacent the first slot.

5. The method recited by claim 4 wherein the third jaw deforms the upturned male lip and U-shaped female channel in the first direction adjacent the second slot, and the fourth jaw deforms the upturned male lip and U-shaped female channel in the second, opposite direction adjacent the second slot.

6. The method recited by claim 1 wherein the step of selectively moving the cutting edges of the first and second jaws generally toward each other includes the steps of:
   a. moving the cutting edge of the first jaw within a first plane;
   b. moving the cutting edge of the second jaw within a second plane; and
   c. causing the first and second planes to be generally coplanar.

7. The method recited by claim 6 wherein the step of selectively moving the cutting edges of the third and fourth jaws generally toward each other includes the steps of:
   a. moving the cutting edge of the third jaw within a third plane;
   b. moving the cutting edge of the fourth jaw within a fourth plane; and
   c. causing the third and fourth planes to be generally coplanar.

8. The method recited by claim 1 further including the step of mounting the first, second, third and fourth jaws for rotation about a common pivot axis.

9. The method recited by claim 1 further including the steps of coupling the first and third jaws to each other for synchronized movement with each other, and coupling the second and fourth jaws to each other for synchronized movement with each other.

10. The method recited by claim 1 including the steps of disposing the second jaw generally between the first and third jaws, and disposing the third jaw generally between the second and fourth jaws.

11. The method recited by claim 1 including the steps of:
   a. forming the cutting edge of the first jaw on a first side of the first jaw, the first jaw including an opposing second side that forms a non-cutting edge; and
   b. forming a bevel on the first jaw from the cutting edge toward the non-cutting edge whereby the cutting edge of the first jaw extends further into the side-lapped seam of the steel deck structure than the non-cutting edge thereof;
   whereby the first jaw displaces the male lip and female channel more significantly proximate the cutting edge of the first jaw than proximate the non-cutting edge of the first jaw.

12. The method recited by claim 11 including the steps of:
   a. forming the cutting edge of the second jaw on a first side of the second jaw, the second jaw including an opposing second side that forms a non-cutting edge; and
   b. forming a bevel on the second jaw from the cutting edge thereof toward the non-cutting edge thereof whereby the cutting edge of the second jaw extends further into the side-lapped seam of the steel deck structure than the non-cutting edge thereof;
   whereby the second jaw displaces the male lip and female channel more significantly proximate the cutting edge of the second jaw than proximate the non-cutting edge of the second jaw.

13. The method recited by claim 12 including the steps of:
   a. forming the cutting edge of the second jaw on a first side thereof, the second jaw having an opposing second side that forms a non-cutting edge of the second jaw;
   b. forming the cutting edge of the third jaw on a first side thereof, the third jaw having an opposing second side that forms a non-cutting edge of the third jaw; and
   c. maintaining the non-cutting edges of the second and third jaws spaced apart from each other even as the cutting edges of the first and second jaws at least partially overlap each other at the closed position.

14. A method of forming an attachment in an interlocking side-lapped seam of a steel deck structure, the method comprising the steps of:
   providing at least two pairs of jaws, each such jaw having a cutting edge thereon;
   moving said at least two pairs of jaws towards one another from opposite sides of the side-lapped seam, and causing the cutting edge on one jaw of each pair to at least partially pass a cutting edge of the other jaw of such pair from the opposite sides of the side-lapped seam, each such pair of jaws cutting an elongated opening through the side-lapped seam; and
   displacing a first portion of the side-lapped seam in a first direction on one side of each elongated opening, and displacing a second portion of the side-lapped seam in a second direction opposite the first direction on the opposite side of each elongated opening.

15. A method of forming an attachment in en interlocking side-lapped seam of a steel deck structure, the steel deck structure including at least first and second steel deck panels, the first steel deck panel including an upturned male lip along one side edge thereof, the second steel deck panel including a downwardly-directed U-shaped female channel along one side edge thereof, the upturned male lip of the first steel deck panel extending into downwardly-directed U-shaped female channel of the second steel deck panel, the U-shaped channel including first and second walls generally parallel to each other, the method comprising the steps of;
   a. positioning a pair of first jaws proximate the first wall of the female channel, each of the first jaws having a cutting edge;
   b. positioning a pair of second jaws proximate the second wall of the female channel, each of the second jaws having a cutting edge, each second jaw being disposed generally proximate one of the first jaws but laterally offset therefrom; and
   c. selectively moving the pair of first jaws generally toward the pair of second jaws from an open position to a closed position causing the cutting edge of each first jaw to at least partially pass the cutting edge of a second jaw to cut a pair of spaced apart slots through the U-shaped channel and the male lip.

16. The method recited by claim 15 wherein the pair of spaced apart slots includes a first slot offset in one direction and a second slot offset in the opposite direction.

17. The method recited by claim 15 wherein the pair of first jaws are spaced apart from each other, and the pair of second jaws are spaced apart from each other.

18. The method recited by claim 15 wherein each first jaw deforms the upturned male lip and the U-shaped female channel in a first direction adjacent each slot, and each second jaw deforms the upturned male lip and the U-shaped female channel in a second, opposite direction adjacent each slot.

19. The method recited by claim 15 wherein the step of selectively moving the pair of first jaws generally toward the pair of second jaws includes the steps of:
   a. moving the cutting edge of each first jaw within a first plane; and
   b. moving the cutting edge of a second jaw within a second plane that lies parallel to, and closely proximate to, the first plane.

20. The method recited by claim 15 further including the step of rotating the pair of first jaws about a pivot axis.

21. The method recited by claim 20 further including the step of rotating the pair of second jaws about the pivot axis.

22. The method recited by claim 15 further including the step of coupling the pair of first jaws to each other for synchronized movement with each other.

23. The method recited by claim 15 further including the steps of:
   a. forming a cutting edge on a first side of each first jaw, each first jaw including an opposing second side that forms a non-cutting edge; and
   b. forming a bevel on each first jaw from the cutting edge thereof toward the non-cutting edge thereof the cutting edge of each first jaw extending further into the side-lapped seam of the steel deck structure than the non-cutting edge thereof;

whereby each first jaw displaces the male lip and the female channel more significantly proximate the cutting edge of each first jaw than proximate the non-cutting edge thereof.

24. The method recited by claim 23 including the steps of:
   a. forming a cutting edge on a first side of each second jaw, each second jaw including an opposing second side tat forms a non-cutting edge; and
   b. forming a bevel on each second jaw from the cutting edge thereof toward the non-cutting edge thereof, the cutting edge of each second jaw extending further into the side-lapped seam of the steel deck structure than the non-cutting edge thereof;

whereby each second jaw displaces the male lip and female channel more significantly proximate the cutting edge of each second jaw than proximate the non-cutting edge thereof.

25. The method recited by claim 24 including the steps of:
   a. disposing a selected one of the second jaws generally between the pair of first jaws, with the cutting edge of the selected second jaw generally facing the cutting edge of one of the first jaws, and the non-cutting edge of the selected second jaw generally facing the non-cutting edge of the other first jaw; and
   b. maintaining the non-cutting edge of the selected second jaw and the non-cutting edge of said other first jaw spaced apart from each other even as the cutting edge of said one first jaw and the cutting edge of the selected second jaw at least partially overlap each other at the closed position.

* * * * *